United States Patent [19]

Moore et al.

[11] Patent Number: 5,646,764

[45] Date of Patent: Jul. 8, 1997

[54] OPTICAL BEAM SCANNER WITH ROTATING TRANSMISSIVE OPTICS

[75] Inventors: Gerald T. Moore; Karl W. Koch, both of Albuquerque, N.M.; Eric C. Cheung, Redondo Beach, Calif.

[73] Assignee: The United States of America as represented by the Secretary of the Air Force, Washington, D.C.

[21] Appl. No.: 443,297

[22] Filed: May 17, 1995

[51] Int. Cl.$^6$ ............................ G02B 26/08; H01S 3/10; H01S 3/08

[52] U.S. Cl. ........................ 359/201; 359/196; 359/209; 359/200; 372/22; 372/98

[58] Field of Search ............................ 359/200, 201, 359/209, 196, 211, 831, 837; 372/14–16, 21, 22, 33, 98

[56] References Cited

U.S. PATENT DOCUMENTS

| | | | |
|---|---|---|---|
| 4,118,109 | 10/1978 | Crawford et al. | 359/196 |
| 4,860,302 | 8/1989 | Janes | 372/70 |
| 5,012,485 | 4/1991 | Ohmori | 372/108 |
| 5,034,627 | 7/1991 | Ayral et al. | 307/426 |
| 5,084,883 | 1/1992 | Khalid et al. | 372/24 |
| 5,095,491 | 3/1992 | Kozlovsky et al. | 372/94 |
| 5,168,385 | 12/1992 | Kobayashi et al. | 359/209 |
| 5,280,491 | 1/1994 | Lai | 372/24 |
| 5,319,490 | 6/1994 | Ansley | 359/209 |
| 5,321,718 | 6/1994 | Waarts et al. | 372/108 |
| 5,339,188 | 8/1994 | Fritzel | 359/200 |
| 5,341,236 | 8/1994 | Stappaerts | 359/328 |
| 5,373,381 | 12/1994 | Alfano et al. | 359/108 |
| 5,526,167 | 6/1996 | Peng | 359/209 |

OTHER PUBLICATIONS

D. Hon, "High Average Power, Efficient Second Harmonic Generation", in *Laser Handbook*, vol. 3, Ed. by M.L. Stitch (North Holland, Amsterdam, 1979) pp. 421–484.

T. Jeys, "840–Hz Nd: YAG Laser Source of Sodium Resonance Radiation", Final Report to the USAF Phillips Laboratory, Contract F19628–90–C–0002 (1992).

Koch et al., Articles, Opt. Lett., 16, 1436–1438 (1991).

*Primary Examiner*—James Phan
*Assistant Examiner*—Darren E. Schuberg
*Attorney, Agent, or Firm*—Stanton E. Collier

[57] ABSTRACT

The present invention is a beam scanner for use about a nonlinear optical crystal for frequency conversion. The scanner oscillates the high power laser beam passing through the crystal to reduce heat damage and does not change the direction or the position of the beam upon exiting the scanner. A pair of thick optical plates are affixed to a driven axle being parallel to the laser beam direction. The first plate is mounted at a given angle to the axle and the second plate is mounted at the same but negative angle to the axle so that they are mirror images about the crystal. As the axle rotates, the laser beam moves through the crystal in a cylindrical pattern and due to the manner of mounting the plates, the exiting laser beam is not displaced from the original beam direction or position. The beam scanner may be inserted into an existing optical resonator, for example, without modifications thereto.

4 Claims, 1 Drawing Sheet

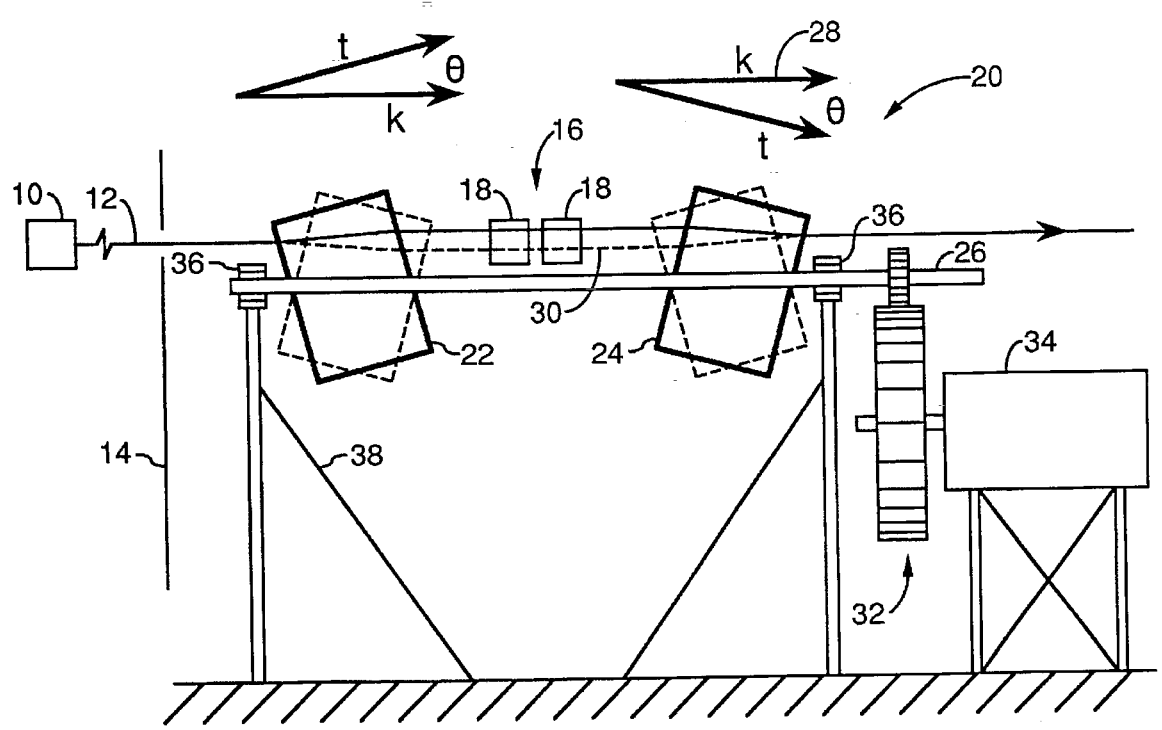

OPTICAL BEAM SCANNER WITH ROTATING TRANSMISSIVE OPTICS

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers, and, in particular, relates to interacting with laser beams.

A laser emits a beam of light of a unique nature which is of a fixed wavelength, for example. The use of this beam in a particular application may require a different wavelength. This may be accomplished either intracavity or external thereto with the use of, for example, second-harmonic generators. The use of nonlinear crystals for frequency conversion processes is well known. The use of high power laser beams therein can severely degrade the nonlinear crystals because of heating due to the absorption of light. Thermal gradients lead to gradients in the indices of refraction which disrupt phase matching and can adversely affect the transverse beam quality. Excessive heating may also lead to crystal damage. Optical beam scanning provides a means to spread the thermal load over the cross-section of the crystal, while preserving the small beam cross-section, and consequent high peak intensity needed for efficient frequency conversion. The scanner must keep the beam direction constant in the crystal to preserve phase matching. The scanner must further both introduce a transverse scanning motion of a few millimeters to the beam incident on the crystal and remove this motion from the beam after it leaves the crystal. The scanner must also not alter the optical polarization relative to the crystal since only particular polarization states are phase matched. Rapid scan rates may be desirable to correspond to convenient submultiples of optical pulse frequencies.

The use of beam scanning to produce second harmonic generators is described, for example, in Laser Handbook, vol. 3, pp. 421–484, 1979, which is incorporated by reference. In one arrangement, five lithium niobate crystals were placed in an oven and rode on a vibrating rail at 4 Hz between two springs which resulted in intracavity doubling of Nd:YAG radiation. The device clearly would not be suitable for a high scan rate and would be difficult to implement with a critically phase-matched interaction because of narrow angular acceptance. Other devices may use a scanning mirror having a saw-tooth motion or a rotating annular ring of a uniaxial crystal. Both of these devices impart a net beam deflection and are thus unsuitable for insertion into a laser beam cavity, and further the later may be affected by the dependence of the effective nonlinear coefficient on azimuthal angle.

Thus there exists a need for a device which causes a laser beam to interact with a frequency conversion device that is able to handle high powers and not alter the outgoing beam direction.

SUMMARY OF THE INVENTION

The present invention is a beam scanner for use about a nonlinear optical crystal for frequency conversion. The scanner oscillates the laser beam passing through the crystal to reduce heat damage and does not change the direction of the beam upon exiting the scanner. A pair of thick optical plates are affixed to a driven axle being parallel to the laser beam direction. The first plate is mounted at a given angle to the axle and the second plate is mounted at the same but negative angle to the axle so that they are mirror images about the crystal. As the axle rotates, the laser beam moves through the crystal in a cylindrical pattern and due to the manner of mounting the plates, the exiting laser beam is not displaced from the original beam direction.

Therefore, one object of the present invention is an optical scanner for reducing heat damage in nonlinear crystals used for frequency conversion.

Another object of the present invention is an optical scanner that reduces heat damage to a nonlinear crystal and further does not change the direction of the laser beam passing through the scanner.

Another object of the present invention is an optical scanner that reduces heat damage to a nonlinear crystal and further does not change the direction of the laser beam passing through the scanner and can operate at a high frequency.

Another object of the present invention is an optical scanner that reduces heat damage to a nonlinear crystal, further does not change the direction of the laser beam passing through the scanner, can operate at a high frequency and can be used in both internal and external laser cavities of laser resonators.

These and many other objects and advantages of the present invention will be readily apparent to one skilled in the pertinent art from the following detailed description of a preferred embodiment of the invention and the related drawings.

BRIEF DESCRIPTION OF THE DRAWINGS

The only Figure illustrates the use of the beam scanner of the present invention placed about nonlinear crystals for frequency conversion.

DESCRIPTION OF THE PREFERRED EMBODIMENT

Referring to the only Figure, a laser 10 emits a beam 12 which enters an optical resonator 14, for example, not further detailed except as discussed herein below. One function to be accomplished in resonator 14 may be frequency conversion of the laser beam 12 by a second-harmonic generator 16 being, for example, a pair of nonlinear optical crystals 18. A beam scanner 20 operates upon the laser beam 12 as described hereinbelow.

A first and second thick optical glass plates 22 and 24 are affixed to an axle 26 oriented parallel to the beam propagation direction k 28. The axle 26 is mounted to bearings 36 atop a rigid support 38. The plate normals $\bar{t}$ make equal polar angles $\theta$, but opposite azimuthal angles, with respect to $\bar{k}$. Each plate has parallel flat antireflection-coated surfaces. The plate thickness is h, and the index of refraction is n. When the laser beam 12 propagates through the first plate 22, it emerges with its direction unchanged, but displaced transversely by an amount $$\delta = h\sin\theta(1-\cos\theta/\sqrt{n^2-\sin^2\theta}).$$

For example, with n=1.5, h=2.8 cm, and $\theta$=15°, the beam displacement is 2.5 mm. The deplacement is removed by the second plate 24. The Figure shows the plate orientations and beam path when the beam 12 is displaced vertically upward. The plate orientations and beam path half a rotation period later are shown by the dotted lines 30. The nonlinear crystals 18 lie on one side of the axle 26 between the plates 22 and 24. The axle 26 is mounted on bearings and rotated through a gear linkage 32 by a variable-speed motor 34 on the opposite side of the axle from the crystals. This produces beam scanning in the crystals 22 and 24 around a circle of radius δ. The rotational speed can be made commensurate with the optical pulse frequency by suitable electronics, not further shown but considered conventional. By keeping θ small, the transmission of s and p polarizations are both kept close to unity, and the scanner has little effect on the beam polarizations in the crystals.

In nonlinear frequency conversion processes, beams of two or three optical frequencies propagate through the scanner and the nonlinear crystals 18. Dispersion in the plates 22 and 24 sets a lower bound on the beam diameters for which good beam overlap is maintained. For fused silica plates with the above values of θ and h, the scan radii δ for the first and second harmonics of 1.064 microns Nd:YAG radiation differ by 38 microns. For an optical parametric oscillator with a 1.064 micron pump and a 1.319 micron resonant signal, the scan radii differ by only 10 microns. The beam diameters used should be large compared to these differences in radii.

The present invention is capable of high speed which is suitable for use in an optical resonator. The invention can be inserted into the beam essentailly as a single piece of hardware, rather than as a set of components requiring individual alignment. The shape of the plates can be chosen so that they undergo a balanced rotational motion, so that a minimum of vibration occurs in the nearby optical components. For example, plates in the shape of right cylinders of radius $h/\sqrt{3}$ have isotropic moments of inertia and can be spun without torque about any desired axis.

The invention may be further modified. For example, the plates can slide along the axle to a more convenient separation, for altering the separation of the bearings, for substituting axles of different lengths, or for using a telescoping axle. The plates may use interchangeable metal hubs with the outer surface of the hubs parallel to $\bar{t}$ and the inner surface parallel to $\bar{k}$. Different hubs can be used to obtain different angles θ. The outer curved surface of the plates may be a cylinder parallel to $\bar{t}$, and shrink-fit a hot metal band onto this surface. This would provide compressive stresses on the glass for very high speed operation. The invention may be fully enclosed to protect both the components and personnel.

Clearly, many modifications and variations of the present invention are possible in light of the above teachings and it is therefore understood, that within the inventive scope of the inventive concept, the invention may be practiced otherwise than specifically claimed.

What is claimed is:

1. An optical beam scanner, said optical beam scanner comprising:
    means for scanning a light beam through a defined area perpendicular to said beam direction, said optical beam scanner being able to receive at least one input light beam with a given direction and position, said optical beam scanner being able to output at least one output beam being coincident with said at least one input light beam, wherein said scanning means comprises:
    a support structure;
    a motor attached to said support structure;
    gearing means, said gearing means attached to said motor;
    an axle, said axle means attached to said gearing means for rotating said axle at a predetermined rotational speed;
    bearings said axle attached to said bearings, said bearings attached to said support structure; and
    transmissive optical means comprising two transmissive optical plates said transmissive optical means attached to said axle;
    whereby said optical beam scanner may be inserted into an optical train having optical components therein about a particular optical component without modification to the existing optical train components.

2. An optical scanner as defined in claim 1 wherein said transmissive optical means comprises a pair of right cylinders having isotropic moments of inertia.

3. An optical beam scanner, said optical beam scanner comprising:
    means for scanning a light beam through a defined area perpendicular to said beam direction, said optical beam scanner being able to receive at least one input light beam with a given direction and position, said optical beam scanner being able to output at least one output beam being coincident with said at least one input light beam, wherein said scanning means comprises:
    a support structure;
    a motor attached to said support structure;
    gearing means, said gearing means attached to said motor;
    an axle, said axle means attached to said gearing means for rotating said axle at a predetermined rotational speed;
    bearings said axle attached to said bearings, said bearings attached to said support structure; and
    transmissive optical means, said transmissive optical means attached to said axle; said transmissive optical means comprises:
    a first optical plate and a second optical plate, said first optical plate mounted to said axle at an angle θ, said second optical plate mounted to said axle at a negative angle θ, whereby said optical plates are mirror images about a vertical axis perpendicular to said axle, said plates mounted a predetermined distance from each other, said first optical plate shifting said at least one input light beam a predetermined distance from said at least one input beam to form at least one shafted light beam, said second optical plate shifting said at least one beam to form said at least one output beam, said at least one input beam and said output beam having the same direction and position;
    said optical scanner further including a frequency conversion means mounted between said plates;
    whereby said optical beam scanner may be inserted into an optical train having optical components therein about a particular optical component without modification to the existing optical train components.

4. An optical scanner as defined in claim 3 wherein said frequency conversion means comprises at least one nonlinear crystal positioned to receive said at least one shifted light beam.

\* \* \* \* \*